Figure 1:
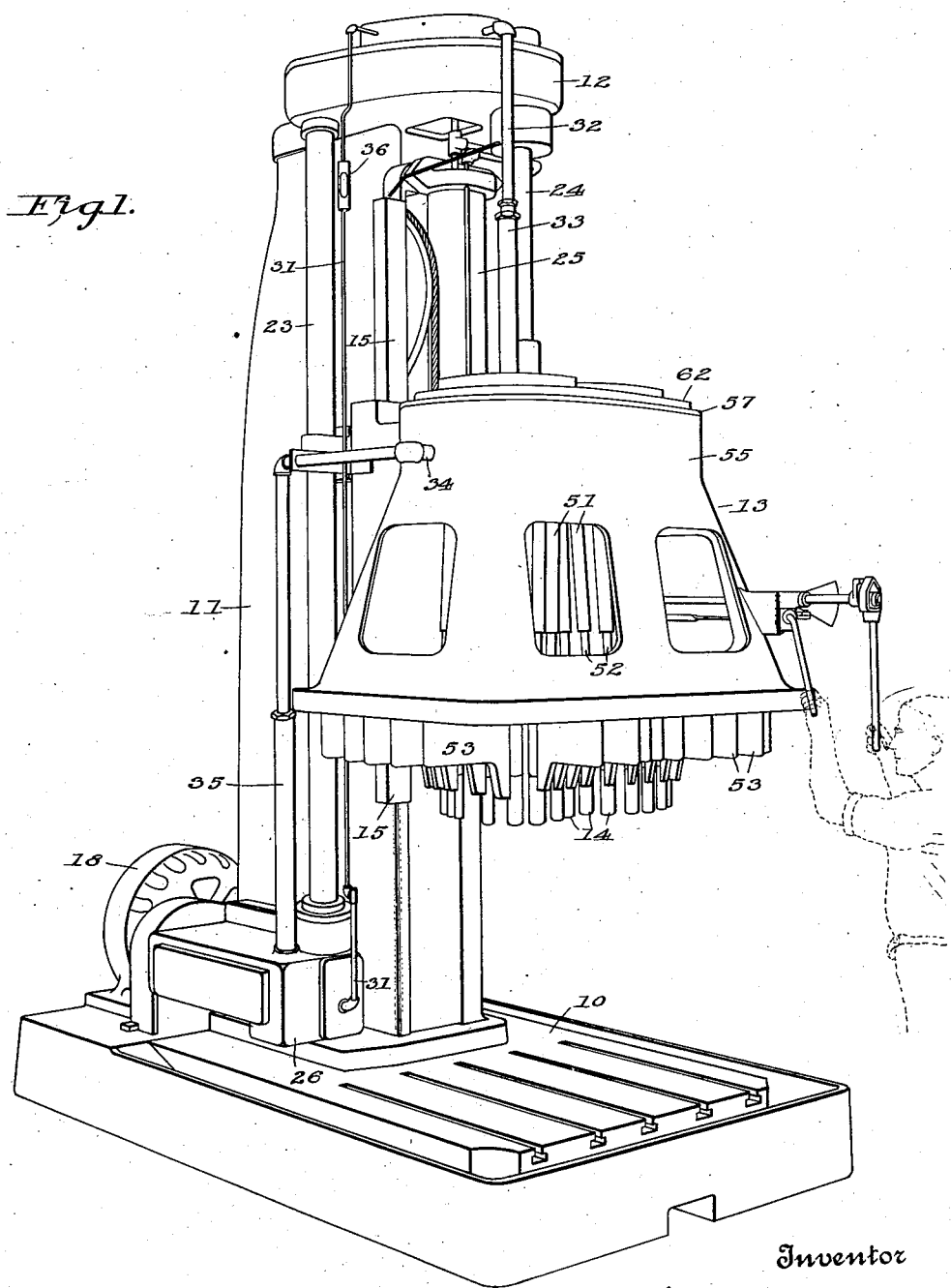

June 3, 1930.   R. M. GALLOWAY   1,762,092
OIL HOUSING FOR DRILL HEADS
Filed June 15, 1927   4 Sheets-Sheet 1

Inventor
Robert M. Galloway
By   Attorney
Nathan & Bowman

June 3, 1930.  R. M. GALLOWAY  1,762,092
OIL HOUSING FOR DRILL HEADS
Filed June 15, 1927  4 Sheets-Sheet 2

Inventor
Robert M. Galloway
By Attorney
Nathan & Bowman

June 3, 1930.  R. M. GALLOWAY  1,762,092
OIL HOUSING FOR DRILL HEADS
Filed June 15, 1927  4 Sheets-Sheet 3

Inventor
Robert M. Galloway
By  Attorney
Nathan & Bowman

June 3, 1930.  R. M. GALLOWAY  1,762,092
OIL HOUSING FOR DRILL HEADS
Filed June 15, 1927   4 Sheets-Sheet 4
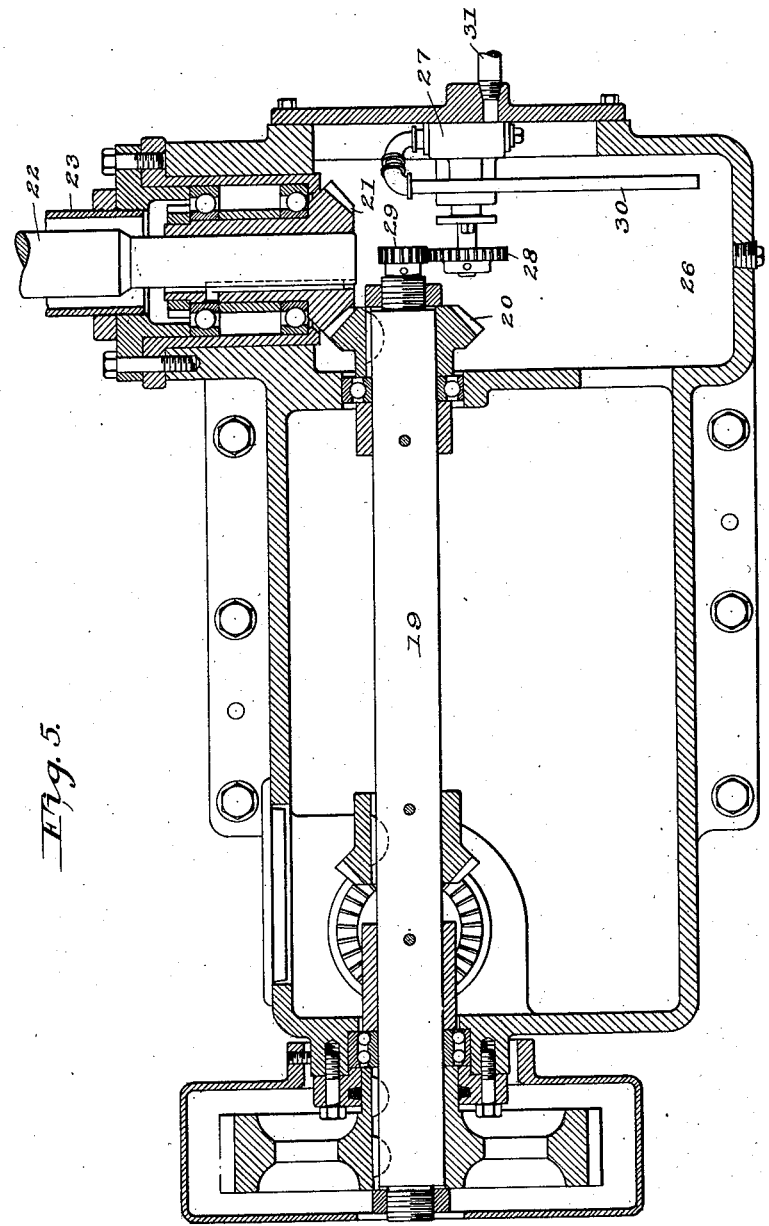
Inventor
Robert M. Galloway
By Attorney
Nathan & Bowman

UNITED STATES PATENT OFFICE

ROBERT M. GALLOWAY, OF RICHMOND, INDIANA, ASSIGNOR TO THE NATIONAL AUTOMATIC TOOL COMPANY, OF RICHMOND, INDIANA, A CORPORATION OF INDIANA

OIL HOUSING FOR DRILL HEADS

Application filed June 15, 1927. Serial No. 198,965.

This invention is concerned with the provision in a machine tool of means for properly lubricating the bearings of vertically arranged rotary shafts. An example of such shafts is shown and a specific application of the invention is disclosed herein in connection with a tool commonly known as an upright multiple spindle drill.

In connection with horizontally arranged shafts various ingenious and successful devices have been conceived and developed whereby the horizontal bearings thereof receive ample lubricant from a continuous and dependable source. However, the proper lubrication of such horizontal shafts has been materially aided by natural characteristics inherent in such constructions chief of which is the tendency of oil to flow along a horizontally arranged rotary shaft which results in oil working its way into bearings often times relatively remote from the source.

In cases of vertically arranged shafts where the upper ends normally protrude through the upper portion of a supporting frame or housing there is but very little tendency of oil to creep upward along the shaft to the upper bearing in or on the upper part of the supporting housing and consequently different and more difficult problems are encountered in devising means for their proper lubrication.

In an attempt to provide proper lubrication for these bearings supporting vertical shafts various arrangements of oil holes, passages, wicks, and oil cups have been resorted to which in most cases are more or less exposed and thereby subject to being clogged up with foreign matter, or the oil cups being broken off and in the majority of cases are dependent upon the conscientious application by the operator of an oil can or other mediums and are therefore too often neglected or entirely overlooked.

It is an object of this invention to provide a continuous and reliable lubricating means for such bearings and one which is not dependent upon the close attention of the operator and such object is attained by a comparatively small change in the construction of the ordinary supporting housing or frame.

In a machine tool wherein the construction includes a plurality of vertical shafts rotatively mounted but fixed against axial movement such shafts are usually accompanied by related gearing and operating mechanism and the whole supported in a housing or frame with the vertical shafts arranged with bearings in an upper horizontal supporting plate or web forming part of the housing. Such bearings may be simple radial bearings or thrust bearings or a combination of the two as shown herein. It is a specific object of this invention to provide reliable lubricating means for bearings of this type which may include various adaptable means such as a spray or reservoir enclosing the shaft ends whereby there is a constant application of oil to the extreme upper ends of the shafts and results in the oil flowing downward therefrom throughout the full extent of the bearings.

Modern regulations and the smooth operation of these machines require that the operating parts be properly enclosed in a casing to exclude dust and dirt from the bearings and also to prevent foreign objects from coming into contact with moving parts of the machine. The present invention includes in its objects the provision of such a protecting covering which may be readily removed to permit access to the bearings and other parts for adjustment thereof and at the same time co-operates to form a chamber surrounding and protecting the lubricating means and if desired may be as disclosed herein sufficiently tight to provide a chamber adapted to be partially filled with oil thereby accomplishing a plurality of functions with a very much simplified construction.

This invention also contemplates the provision of gravity feed lubricating means in co-operation with the novel oil chambers noted above. Gravity oil feeds have been previously adapted to machine tools but they have often proved unsuccessful in that no means were found for properly lubricating certain bearings. This invention, however, has applied certain gravitational features in combination with a reservoir immediately adjacent thereto whereby such gravitation or lubrication has been rendered more efficient and dependable.

This invention has certain characteristics which renders it particularly advantageous in connection with a movable drill head carrying a plurality of rotatable spindles which are affixed against axial movement in the head and which accordingly requires vertical thrust bearings to support the spindles. A single chamber has been provided which encloses the thrust bearings which chamber is maintained sufficiently filled with lubricant to constantly maintain the thrust bearings immersed therein. This is accomplished in a very simple manner by the mere application of a light cover or casing applied to the upper surface of a well-known multiple spindle drill head.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 2:
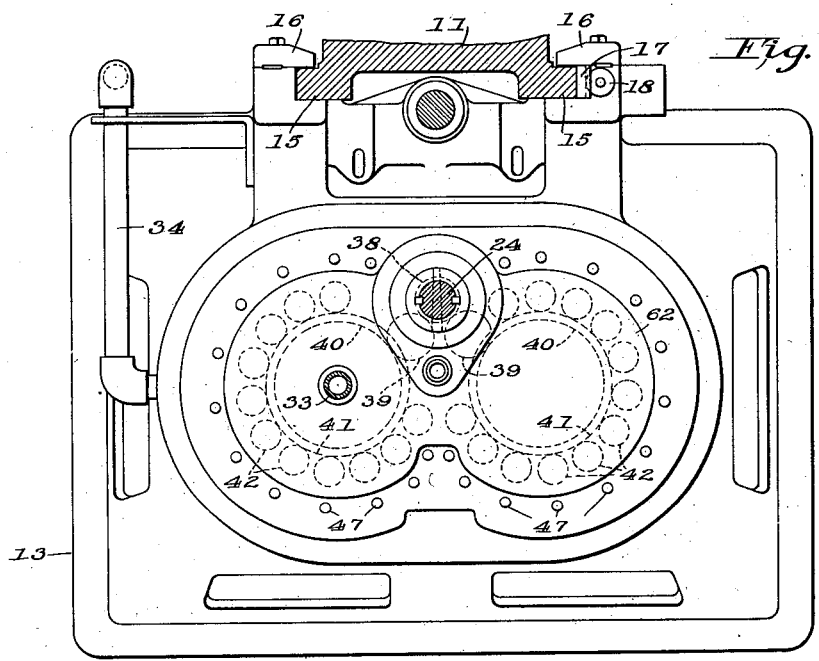
Figure 3:
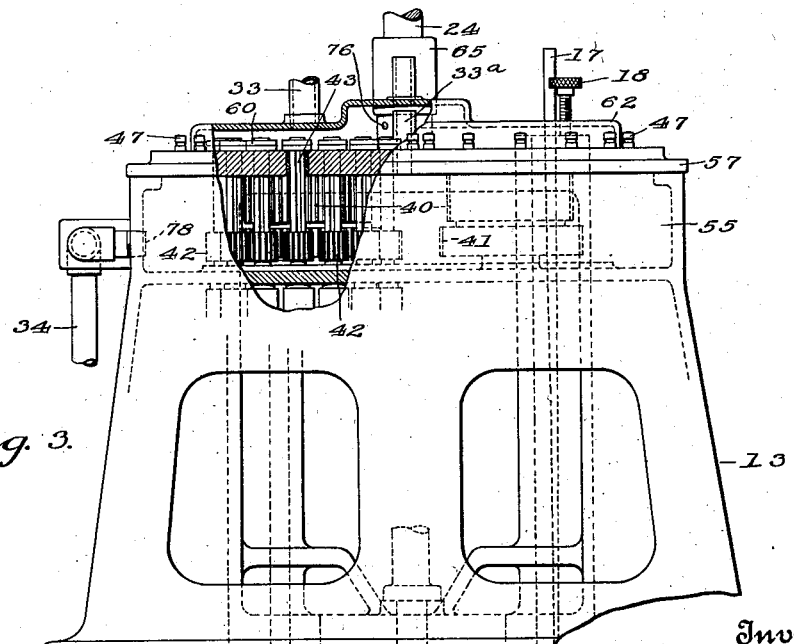
Figure 4:
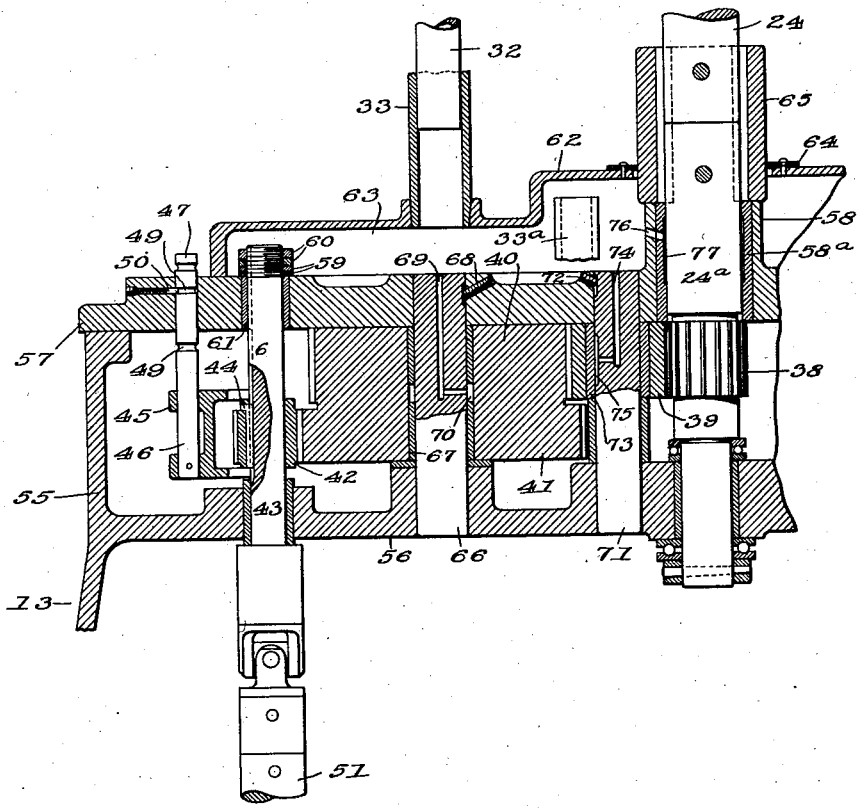

Figure 1 is a vertical elevational view of an upright multiple spindle drill. Fig. 2 is a horizontal plan view of the movable drill spindle head mounted thereon. Fig. 3 is a front elevational view of the head with a part of the casing broken away to show the plurality of spindles therein. Fig. 4 is a detail cross sectional view of the head showing the arrangement of oil ducts therein and Fig. 5 is a vertical sectional view of the oil sump showing the pump mounted therein.

This invention is shown as a part of and as incorporated in a multiple spindle upright drill of which the general construction consists of a supporting base 10 having mounted thereon the large vertical supporting column 11 with a gear casing 12 mounted at the top thereof. A large movable head 13 carrying a plurality of spindles 14 is mounted for translation upon the ways 15 being held in engagement therewith by the straps 16 shown in Fig. 2 and having a gib 17 adjustable by means of the knob 18 to render the head free from play on its ways.

Any suitable driving means may be provided which, as shown herein, may be an electric motor 18 geared to drive the shaft 19 which, through bevel gears 20 and 21, drives the vertical shaft 22 which leads to the gearing mounted in the upper head 12. The vertical shaft 22 is enclosed in a protective sleeve 23. The driving force is transmitted through the shaft 24 to the head 13. The head 13 is vertically movable upon its ways 15 by any suitable means such as the fluid pressure cylinder 25 shown in Fig. 1. Suitable spline connections are provided in connection with the shaft 24 to permit vertical movement of the head 13.

The oiling system includes in general a sump 26 shown in Fig. 5 having mounted therein the pump 27 geared to the shaft 19 through spur gearing 28 and 29 whereby the pump is continuously driven when the tool is operated. The pump 27 withdraws the fluid from the bottom of the sump through the pipe 30 and forces it out through pipe 31 to the gearing in the upper housing 12 where it is collected in a reservoir and then flows through a telescoping pipe having the sections 32 and 33 to the head 13. The oil collects in the bottom of the gear housing of the head 13 and is led therefrom through the pipe 34 which telescopes with the pipe section 35 back into the sump. The line 31 is provided with a sight gauge 36 as is customary in systems of this type.

The details of the head construction with which this invention is chiefly concerned will now be described. Co-axial with rotating shaft 24 and driven thereby is a short shaft 24ª on which are cut the gear teeth of spur gear 38 adapted to mesh with and drive two idler gears 39 each of which idler gears drives a larger spur gear 40. These details are most clearly shown in Fig. 4 and as shown therein the gear 40 has integral therewith a gear 41 adapted to mesh with a plurality of gears 42 mounted on their respective spindle shafts 43.

Means are provided for individually throwing out of gear each of the drill spindles 43, such means comprising a spline connection 44 between the gear 42 and its respective shaft 43 whereby the gear may be shifted vertically by the collar 45 out of engagement with the gear 41. The collar 45 has connected thereto for shifting the collar, a shaft 46 having an upper portion 47 adapted to be grasped by the operator. The two positions of the shaft 46 are determined by the grooves 48 and 49 with which a spring pressed detent 50 is adapted to engage.

Each of the spindle shafts 43 is connected through the ordinary universal joints and telescoping shaft section 51 and 52 with the spindles 14 shown in Fig. 1. The spindles 14 are adjustable by means of the brackets 53 adjustable in the slots 54 in a well known manner.

The details of the head 13 include the main gear housing 55 having a horizontal bearing supporting web member 56. Affixed to the upper surface of the main housing 55 is a flat horizontal head plate 57 which is designed to serve as the support for the various shaft bearings and includes a boss 58 carrying a bushing 58ª for the drive shaft 24ª. Each of the spindles 43 is vertically supported on the plate 57 by means of a bearing engaging the upper plane surface thereof. The shaft 43 has mounted thereon one or more thrust-washers 59 adapted to engage the upper surface of the plate 57 and one or more lock nuts 60. A bearing 61 mounted in the plate 57 provides for side thrust of the shaft 43.

One of the main objects of this invention includes the novel means for maintaining these vertical bearings properly lubricated. Such means consists of a casing 62 adapted to be applied to the upper plane surface of the plate 57 by any suitable screw means to thereby render the chamber 63 enclosed therein leak-proof against loss of oil. If desired, suitable packing or gaskets may be employed between the cover or casing 62 and the adjoining face of the plate 57. The cover 62 is provided with a washer 64 made of leather or any suitable material which engages the sleeve 65 to render the casing dust-proof and to prevent oil splashing therefrom and at the same time allows a slight amount of movement of the sleeve 65 relative to the cover 62. Such covers are a necessary feature in machine tools of this type which are required to operate with great precision and accuracy to prevent any dust or dirt coming in contact with the operating parts such as the bearings 58ª and 61 and also to protect such operating parts from coming in contact with clothing or with other objects liable to be caught thereon. The casing may be easily removed permitting ready access to various operating parts for adjustment or removal thereof. At the same time this casing has been designed to form a chamber acting as an oil reservoir if desired within which the thrust bearings of the shafts 43 continuously rotate. Thus a plurality of functions is accomplished by this construction in a very much simplified manner.

Various ducts are provided for leading the oil to the operating gearing within the head whereby such gears are amply and dependably lubricated by gravity. As shown the integral gears 40 and 41 are mounted to rotate on the shaft 66 which is provided with the bushing 67, the shaft 66 being held against rotation by means of the lock screw 68. An oil duct 69 leads from the chamber 63 to the groove 70 to thereby continuously supply the bearing with oil under a light pressure. In like manner the idler gear 39 is mounted on the shaft 71 which is fixed against rotation by means of a set screw 72 and is provided with a bushing 73. The duct 74 supplies oil to the bushing through groove 75 therein.

As previously described oil is led thru the cover to the chamber 63 by the pipe 33. An overflow pipe 33ª serves to maintain the oil at a height corresponding thereto whereby the oil remains constantly above the shaft bearings and above the opening 76 leading to the vertical slot 77 in bearing 58ª for the vertical shaft 24ª. The excess oil is conducted thru the overflow pipe into the lower reservoir formed by the horizontal web 56. The oil is maintained therein to a height equal to the position of opening 78 of the return pipe 34 whereby a certain amount of oil remains in the lower reservoir to freely lubricate the several gears 42 rotating at a high speed therein.

It is to be understood that the invention is not to be limited to the particular oil circuit disclosed but that various other means may be resorted to as e. g. the continuous supply to the upper reservoir in the head may be replaced by any means of maintaining a sufficient level of oil therein, or on the other hand the overflow pipe may be altered or removed so long as there is provided a substantially constant supply of oil to the upper ends of the shafts. The upper chamber at any event serves either as a reservoir or as a collecting chamber for oil supplied to the upper spindle ends and to thereby provide a constant flow of oil under gravity flow to all the bearings within the lower part of the housing. The continuous lubrication thereof is positively ensured and is not dependent upon the oil being splashed or seeping into the bearings. The upper bearings 58ª and 61 of the spindles which rotate at a high rate of speed are constantly immersed in oil and are not dependent upon such unreliable devices as oil creeping up thereto from the lower housing or the intermittent application of oil thereto from above.

The novel means disclosed herein co-operate to form a simple compact structure which operates in a most efficient and economical manner to lubricate a large number of rotating shafts and bearings and at the same time includes a protective covering for the various operating parts.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of United States:—

1. A machine tool head combining a housing having lower and upper web members, the upper web member having an upper substantially horizontal surface; a plurality of spindle drive shafts journaled in said web members and having ends extending above said surface; thrust bearings engaging said surface and supporting said shafts; an inverted pan-like member removably attached to the upper surface of the upper web member and enclosing the ends of said shafts and thrust bearings to form a protective covering therefor and to cooperate with said surface to form an oil chamber.

2. A machine tool head combining a housing having lower and upper web members the upper web member having an upper substantially horizontal surface; a main drive shaft journaled in said housing; a plurality of spindle drive shafts journaled in said web members and having ends extending above said surface; thrust bearings engaging said surface and supporting said shafts; gearing connecting said main drive shaft and said spindle drive shafts, said gearing being located between said web members; means projecting through the upper web member for disconnecting each of said spindle drive shafts from said gearing; and a casing having a downwardly extending flange engaging the upper web member between said thrust bearings and said disconnecting means to form with said upper web member an oil chamber to lubricate said thrust bearings.

3. A machine tool head combining a housing having an upper surface; a plurality of spindle drive shafts journaled in said housing and extending above said surface; thrust bearings engaging said surface and supporting said shafts; a main drive shaft having its lower end journaled in said housing; an inverted pan-like member enclosing said thrust bearings and cooperating with said surface to form an oil chamber for said bearings, said member being formed with an opening for said main drive shaft; a packing element surrounding said shaft to form a seal between said member and said shaft; and an oil conduit connected with said member substantially at one side of said main drive shaft.

In witness whereof, I have hereunto subscribed my name.

ROBERT M. GALLOWAY.